June 22, 1965 A. M. A. MAJENDIE 3,191,147
VARIABLE STIMULUS PERIPHERAL VISION INDICATOR
Filed Sept. 4, 1958 5 Sheets-Sheet 5

A.M.A. MAJENDIE
*Inventor*

By *Moore & Hall*
*Attorneys*

United States Patent Office 3,191,147
Patented June 22, 1965

3,191,147
VARIABLE STIMULUS PERIPHERAL VISION INDICATOR
Alastair Michael Adair Majendie, Cookham Dean, England, assignor to Smiths America Corporation, Washington, D.C.
Filed Sept. 4, 1958, Ser. No. 758,970
Claims priority, application Great Britain, Sept. 17, 1957, 29,280/57; Oct. 25, 1957, 33,451/57
22 Claims. (Cl. 340—27)

The present invention relates to the communication of intelligence to an observer by visual means.

It has been known for some time that the peripheral region of the retina of the human eye, sometimes referred to as the parafovea, is responsive to change of optical stimulus, rather than to stimulus. This fact has been utilised, for example, in the provision of flashing warning lights. A flashing warning light so positioned that its image falls on the parafoveal region of the eye is much more readily noticed than is a steady light.

It is an object of the present invention to provide means whereby the parafovea may be utilised to impart to an observer intelligence as to the departure of some quantity from a datum value thereof.

According to one aspect of the present invention we provide in a visual indicating device two similar sources of changing optical stimulus, together with means to vary, in relation to each other, the changes of stimulus provided by the two sources in accordance with departure of a quantity from a datum value thereof. Conveniently the changes of stimulus provided by the two sources may vary in opposite senses from a common datum.

The change of stimulus may take a variety of forms. It may for example be a change of position, a periodicity of flashing, a change of size, or a change of brightness; and more than one of these may be used simultaneously, so that their effects reinforce each other or cooperate to produce a desired response.

The sources may, but need not necessarily, be spaced apart. They may for example be so sited that in the normal position of the observer's head they lie one on either side adjacent to a horizontal plane through his eyes.

According to another aspect of the invention we provide in a visual indicating device, at least one source of changing optical stimulus, said source of changing stimulus being a light source adapted to move along a linear path, and means to vary the source of changing optical stimulus in accordance with departure of a quantity from a datum value thereof, said means controlling the rate of movement of the light source along the path. The motion of the source may be continuous or discontinuous, and it is to be understood that if the motion is discontinuous the mean rate of movement is intended.

Preferably the rate of movement along the linear path is zero when the quantity has its datum value. The light source then may conveniently move in one direction along the path for one sense of deviation and in the opposite direction for the opposite sense of deviation. Furthermore, a pair of light sources may be provided, adapted to move along similar paths symmetrically disposed with respect to the position of an observer.

If the source or sources are so disposed as to stimulate the parafovea of an observer he will be able to appreciate the intelligence conveyed by the invention, and act accordingly, even though the central region of his retina is occupied with the assimilation of intelligence from other sources, such as for example the normal view of objects in his neighborhood or the view of conventional pointer-type indicating instruments, or is unoccupied.

The invention may be applied to the control of an aircraft, when it is desirable for the pilot to retain his view of his external surroundings. It will be appreciated that in these circumstances the central part of the retina is occupied with the assimilation of intelligence from the forward view of the pilot's surroundings; and the present invention may be applied to provide the pilot with appropriate directional guidance without it being necessamry for him to divert his gaze from that forward view. If the pilot of an aircraft in level flight is imagined to be at the centre of a sphere, and the sphere is imagined to be intercepted by three planes, passing through the pilot's head respectively horizontal, vertical in the fore and aft direction and vertical in the transverse direction three circles will be defined. It will be appreciated that sources of changing optical stimulus disposed on the circumferences of these circles, or in locations derived from such circumferences, provide indications in accordance with the invention the response to which may be of a natural or instinctive nature. Such response is or can become subconscious or even a conditioned response, producing automatically "Yes or no, right or left, plus or minus, up or down" action which may be either directive as in the initiation of a new cycle of operation, or corrective as "on course" operation of a vehicle, which may be marine, land or air. Thus, a source or sources of optical stimulus moving along the circumferences of these circles, paths approximating to parts of those circumferences, or further paths more or less parallel to such paths may be used, so a path related to the first circle can be utilised to provide indications for control in yaw, from the second for control in pitch and from the third for control in roll.

Various embodiments of the invention, to assist the control of an aircraft by a human pilot, will now be described with reference to the accompanying drawings, of which

Throughout this description, it is to be understood that the electric signals referred to are D.C. signals, only changing sign when their associated variable changes sign—e.g. a "bank" signal has one sign for bank to the left and the other for bank to the right. The electric circuit changes required if modulated A.C. signals were used will be immediately apparent to those skilled in the art. Also in many instances earth return connections are omitted.

Figure 1:
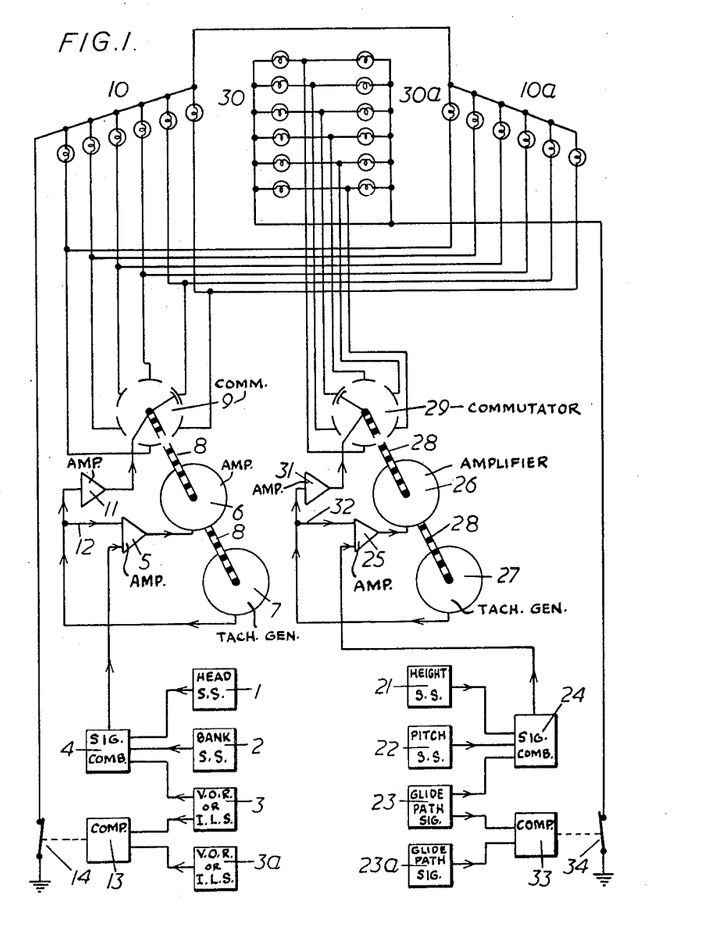
FIGURE 1 shows diagrammatically an embodiment utilising apparently-moving light sources, controlled in accordance with aircraft manoeuvre demands, to provide the required optical stimuli.

Referring to FIGURE 1, numeral 1 indicates a device producing an electrical signal in accordance with deviation of the aircraft from a prior selected heading. This may be for example a gyro magnetic compass such as is described in British Patent specification No. 586,506. Numeral 2 indicates means providing an electrical signal in accordance with bank of the aircraft. This will be most conveniently a gyroscopic artificial horizon provided with a suitable electrical pick-off. Numeral 3 indicates directional radio apparatus, giving an electrical signal in accordance with deviation of the aircraft to one side or other of a radio defined path. This directional radio apparatus may be of any convenient kind, for example, that known under the designations "I.L.S." meaning, Instrument Landing System or "V.O.R.," meaning Very High Frequency Omni-Range.

The signals from devices 1, 2 and 3 are combined in a signal combining device 4 in a known manner to give a further signal, an azimuth manoeuvre demand signal, in accordance with the manner in which aircraft must be manoeuvred in azimuth to enable it to attain and to follow a selected path. The azimuth manoeuvre demand signal is applied to one input of a conventional amplifier 5, whose output drives a motor 6. Motor 6 drives a tachometric signal generator 7 by means of a shaft indicated at 8, generator 7 thus producing a signal in accordance with the actual rate of rotation of the motor 6. This signal is applied, at 12, to another input of amplifier 5, in such a sense as to oppose the azimuth manoeuvre demand signal. Thus motor 6 is controlled, in a known manner, to run at a speed and in a direction in accordance with the azimuth manoeuvre demand.

Shaft 8 also drives the moving arm of a commutator device 9, the fixed contacts of which are connected to successive electric light bulbs in the arrays indicated at 10 and 10A. The moving arm of the commutator is energised by the output of an amplifier 11, whose input is provided by the generator 7. The return circuit for the arrays is completed via a switch 14. Thus normally arrays 10 and 10A give the appearance of sources of light moving in a direction and at a rate in accordance with the azimuth manoeuvre demand. Furthermore amplifier 11 is such that the brightness of the lamps will be at least maintained, and is preferably increased, as the apparent rate of movement is increased.

Switch 14 is controlled by a comparator device 13 arranged to compare the output from directional radio device 3 with the output from a precisely similar device 3A. Switch 14 is opened if there is a substantial discrepancy between the output from devices 3 and 3A. This ensures that if there is a failure of the directional radio equipment, the lights of the arrays of 10 and 10A are extinguished. Alternative methods of operating switch 14 could be adopted in order to extinguish the lights under other failure conditions, in ways well known to those skilled in the art.

See, for example, U.S. Patent No. 2,686,285 to Meredith and Milsom, for Multiple Channel Safety Control for Automatic Pilots. Reference is also made to U.S. Patent No. 2,441,306 to Alkan et al. for Skid Indicator for Aircraft, for additional background.

Means generally similar to those for the control of arrays 10 and 10A in accordance with azimuth manoeuvre demands are provided for the control of arrays 30 and 30A in accordance with pitch manoeuvre demands.

These means comprise a device 21 giving an electric signal in accordance with deviation of the aircraft from a preselected height. This may be, for example, a conventional barometric capsule associated with an electrical pick-off. A device giving a signal in accordance with deviation of the aircraft from a preselected pitch attitude is indicated at 22 and may comprise a gyro vertical provided with an electrical pitch pick-off. Directional radio apparatus indicated at 23 produces, at will, an electric signal in accordance with deviation of the aircraft from a selected glide path. The signals from devices 21, 22 and 23 are combined in signal combining device 24 to give a pitch manoeuvre demand signal which is applied to one input to amplifier 25. Amplifier 25 energises motor 26 driving tachometric generator 27 through shaft 28, the signal from generator 27 being applied, at 32, to another input of amplifier 25 in opposition to the pitch manoeuvre demand signal. Shaft 28 drives commutator 29, which in turn controls the arrays 30 and 30A, the moving contact of commutator 29 being energised from amplifier 31, whose input is derived from generator 27. Amplifier 31 thus controls the lamp brightness in accordance with the apparent rate of movement of the illuminated lamps along the arrays.

A further radio apparatus 23A and comparator 33 and a switch 34, corresponding to devices 3a, 13 and 14 previously referred to in connection with the azimuth control, are also provided. Switch 34, like switch 14, could be operated to extinguish the lamps in various other conditions of failure.

It will thus be seen that the lamps of the pairs of arrays 10 and 10A, and 30 and 30A provide the appearance of light sources moving respectively in accordance with azimuth and pitch manoeuvre demands. The amplifiers 11 and 31 can ensure that the more rapidly the sources appear to move the brighter they appear to become.

Figure 2:
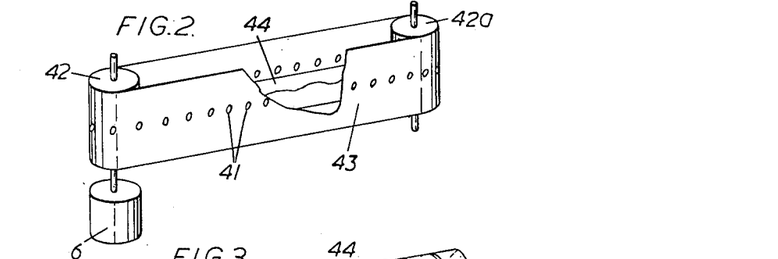
FIGURES 2 to 5 show various means for providing the optical stimuli, alternative to the particular means shown in FIGURE 1.

In the arrangement shown in FIGURE 2, the motor 6 instead of driving a commutator drives a drum 42 over which passes an endless belt 43 of opaque material, the belt being pierced with uniformly spaced holes 41 along its centre line. The belt also passes over a roller 42A, and a strip lamp 44, which is continuously energized during operation, is positioned behind the holes. Thus an illusion of a number of sources moving in accordance with manoeuvre demand is provided.

Figure 3:
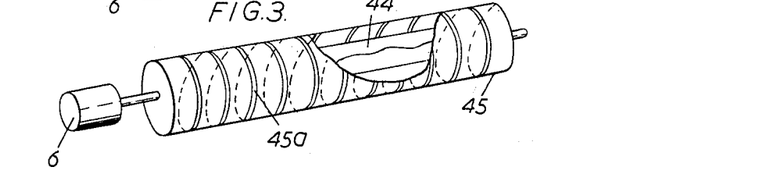

In the arrangement of FIGURE 3 the motor 6 drives an opaque cylindrical shield 45 about its axis. A strip lamp 44, which is continuously energized during operation, is disposed on the axis, and the shield is provided with a helical slot 45A. Rotation of motor 6 in one direction or the other thus results in the appearance of sources of light moving parallel to the axis of the cylindrical shield 45.

Figure 4:
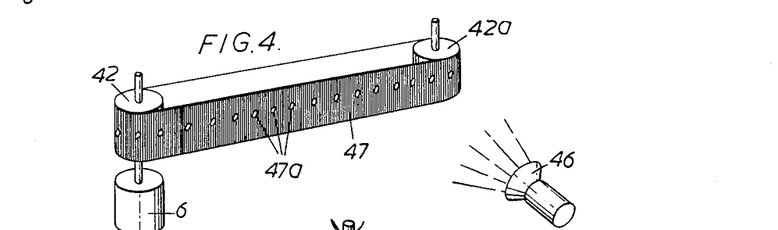

In the arrangement shown in FIGURE 4 motor 6 drives a drum 42 round which passes a continuous belt 47, passing also round a roller 42A. The exposed surface of belt 47 is dark, and is provided with a number of white painted fluorized dots 47A along its centre line. The belt is illuminated by an external source indicated as a floodlight 46, which is continuously energized during operation.

Figure 5:
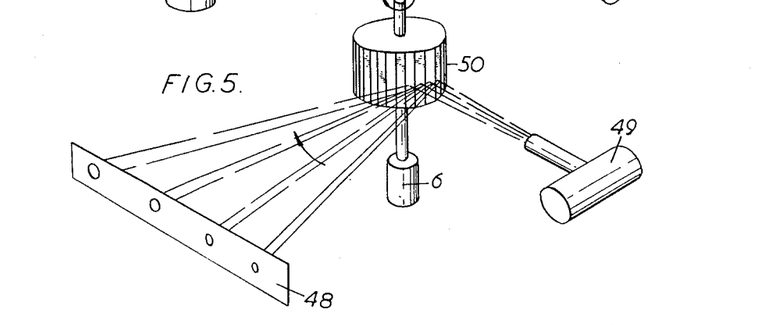

In the arrangement of FIGURE 5 motor 6 drives a polygonal prismatic mirror drum 50, which is illuminated by a projector lamp 49, which is continuously energized during operation, and thus throws on to a screen indicated at 48 a pattern of successive dots of light which move in a direction and at a rate corresponding to the rotation of motor 6.

Figure 6:
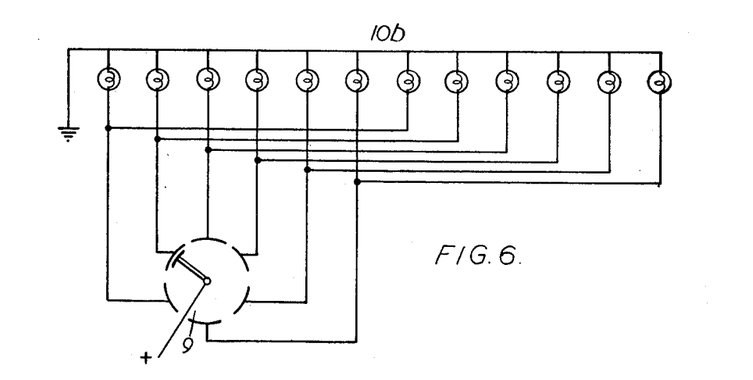
FIGURE 6 shows an alternative method of connecting the lamps in the arrays shown in FIGURE 1.

In the arrangement of FIGURE 6 an array generally similar to those at 10 and 10A of FIGURE 1 is indicated at 10B. However, in the array shown at 10B pairs of lamps, the lamps of each pair being spaced a uniform distance apart, are used instead of the single lamps of arrays 10 and 10A.

It will be appreciated that any of the arrangements shown in FIGURES 2 to 6 may be used for the display of azimuth, pitch or bank manoeuvre demands as may be required.

Figure 7:
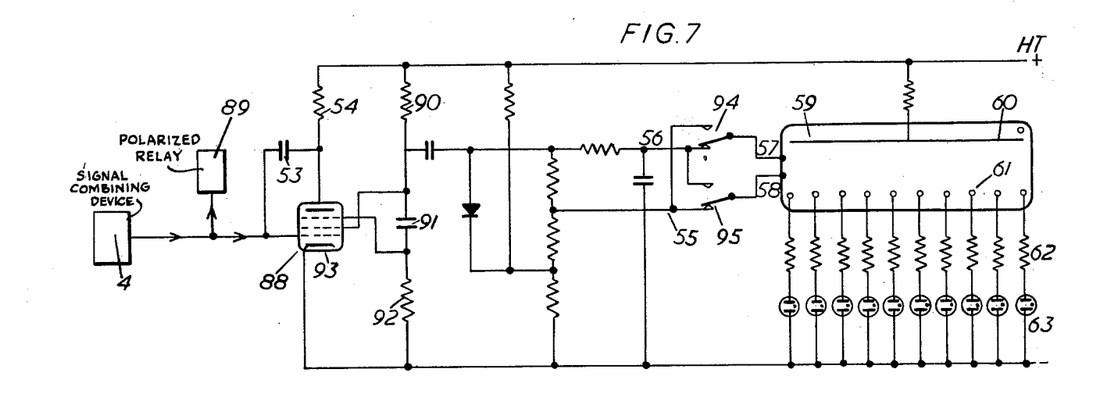
FIGURE 7 shows an electronic method of controlling the energisation of the light sources of an array in accordance with an electric demand signal, this being a further alternative to the electromechanical method shown in FIGURE 1.

FIGURE 7 shows one way in which the electromechanical means provided for the control of the lamps of the arrays 10, 10A etc. described with reference to FIGURE 1 may be replaced by electronic means.

In the arrangement shown in FIGURE 7 the azimuth manoeuvre demand signal from device 4 is applied to the grid of a pentode tube 93, and is also applied to the operating coil 89 of a two-pole double throw polarised relay, the contacts of which are indicated at 94 and 95.

Tube 93 has a conventional anode load resistor 54 and its anode is coupled to its grid through a capacitor 53. In this respect, therefore, the tube is connected in a Miller integrator circuit. The tube is provided with a conventional screen dropping resistor 90, which is coupled to the suppressor grid through a capacitor 91, the suppressor grid being returned to earth through a resistor 92. By virtue of the coupling thus provided between screen and suppressor, therefore, tube 93 is also connected in a transitron oscillator circuit. It will be readily appreciated by those skilled in the art that tube 93 will produce voltage pulses at the junction of resistor 90 and capacitor 91 at a frequency depending upon the magnitude of the azimuth manoeuvre demand signal produced by device 4, and it can, in fact, be arranged that when this signal is zero the tube ceases to oscillate, so that no pulses are produced.

These pulses are applied through a conventional coupling network to a point 55 and through a further conventional lag network to a point 56. Point 55 is connected to one of each of fixed contacts 94 and 95 and point 56 is connected to the other fixed contacts. Thus for one sense of the azimuth manoeuvre demand signal (that shown in the diagram) moving contact 94 is connected to point 56 and moving contact 95 to point 55, and for the other sense of such demand moving contact 94 is connected to point 55 and moving contact 95 to point 56.

Moving contact 94 is connected, at 57, to one guide electrode of a ten channel gas filled counting tube of the kind known under the registered trademark Dekatron, and the moving contact 95 is connected at 58 to the second guide electrode.

The anode 60 of tube 59 is connected to the positive supply through a conventional load resistor and the ten separate cathodes are connected through the separate resistors 62 to gas filled glow lamps 63. In the usual way the discharge in tube 59 connects the anode to one only of the cathodes, and as pulses are applied to the guide electrode terminals 57 and 58, the discharge steps from one cathode to its neighbour in a sense depending upon the timing of the pulses applied to the guide electrodes. Thus the discharge between the anode 60 and cathodes 61 will step from cathode to cathode in a direction and at a rate depending upon the magnitude and sense of the azimuth manoeuvre demand signal.

It will thus be seen that at any instant one of the lamps 63 will be illuminated and the illuminated lamp will appear to move along the array in a direction and at a rate depending upon the azimuth manoeuvre demand, and arrays energised by such means as are shown in this figure may be used in precisely the same way as arrays 10, 10A and 30, 30A.

Figure 8:
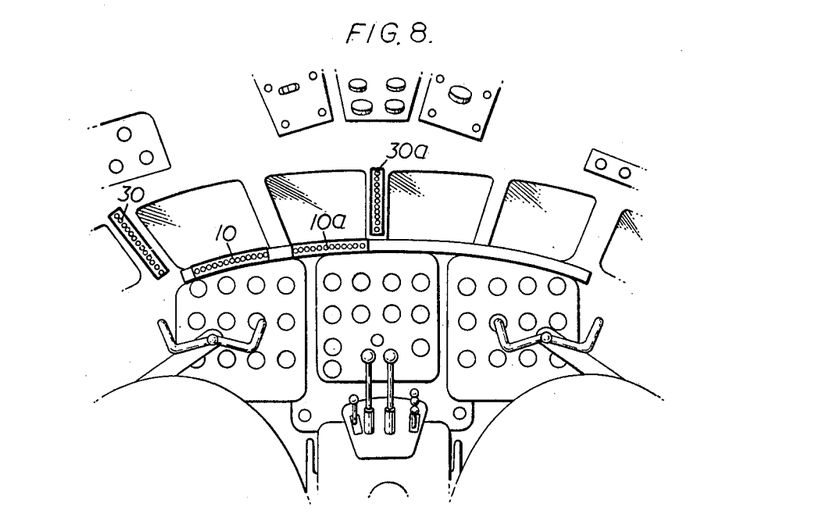
FIGURE 8 shows one manner in which arrays shown in FIGURE 1 may be arranged in the pilot's cockpit of an aircraft.

FIGURE 8 shows one manner in which arrays 10 and 10A and 30, 30A can be mounted in the pilot's cabin of a transport aircraft. It will be seen that arrays 10 and 10A are arranged substantially in a horizontal plane out of the direct vision of the pilot but in his peripheral field of view, whereas arrays 30 and 30A are arranged in similar spaced vertical or near-vertical planes. If an azimuth manoeuvre in one sense is required arrays 10 and 10A will show light sources apparently moving in one sense, and if a manoeuvre in the opposite sense is required the light sources will appear to move in the other sense. It will be preferred generally to have the convention that the pilot manoeuvres in an aircraft in a sense to counteract the apparent movement of the sources, i.e. if the sources appear to move from left to right a bank and turn of the aircraft to the left is required but if desired the reverse convention could be used.

The equivalent convention is preferably also used for the response to pitch manoeuvre demands.

FIGURES 9a to 9d show schematically some alternative ways of arranging these arrays.

Figures 9A, 9B, 9C, 9D, 10, 11:
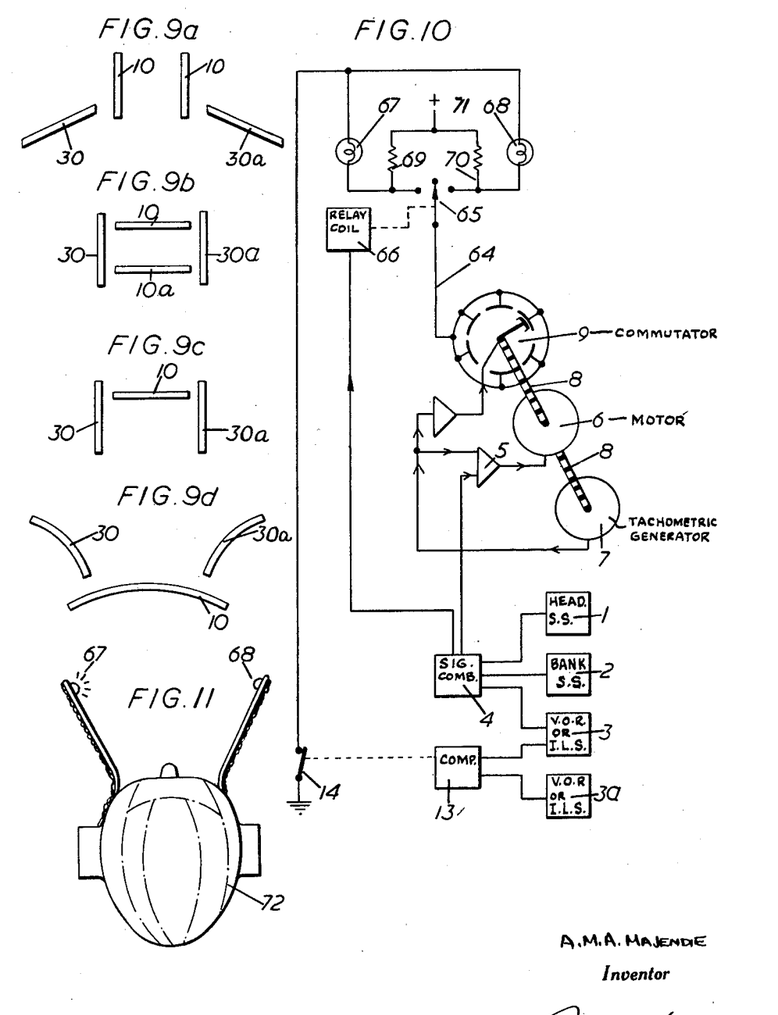
FIGURES 9a to d show some further possible ways in which such arrays may be arranged.
FIGURE 10 shows one manner in which generally stationary light sources may be utilised to impart information.
FIGURE 11 shows one manner in which such sources might be mounted on a pilot's headgear.

In FIGURE 9a arrays 10 and 10A are arranged vertically, and an azimuth manoeuvre demand produces upward movement of the apparent light source of one array and downward movement of the apparent source of the other. A pitch manoeuvre demand results in fore and aft movement of the sources provided by arrays 30 and 30A, which are in a horizontal plane one on either side of the pilot. The appropriate control movements required of the pilot will then be respectively rotation of his "handles," to apply bank, and fore and aft movement of his "stick" to apply pitch.

The significance of all the arrangements shown in FIGURES 9b, 9c and 9d will be immediately obvious to those skilled in the art.

In the arrangement shown in FIGURES 10 and 11 apparently stationary but flashing light sources are utilised to impart information in accordance with the invention.

The arrangement of FIGURE 10 is in many respects very similar to the azimuth control section of FIGURE 1, and similar components in FIGURES 1 and 10 are indicated by the same reference numerals. However, all the fixed contacts of switch 9 in FIGURE 10 are connected together to a line 64 which is connected to the moving contact 65 of a three position polarised relay whose operating coil is indicated at 66. Operating coil 66 is energised by the azimuth manoeuvre demand signal from device 4. One of the extreme fixed contacts associated with contact 65 is connected through a fixed resistor 69 to the positive terminal of a D.C. source indicated at 71. It is also connected through a lamp 67 to the positive terminal of switch 14. Similarly the other extreme fixed contact associated with contact 65 is connected through a resistor 70 to terminal 71, and through a lamp 68 to the positive terminal of switch 14. Thus so long as there is no azimuth manoeuvre demand signal both lamps 67 and 68 are energized through the resistors 69 and 70, respectively, to a degree sufficient to cause them to glow dimly.

When non-zero azimuth manoeuvre demand arises one or other of these lamps, depending upon the sense of the demand, will be caused to flash at a rate and with a brightness dependent on the magnitude of the demand. Again, if a discrepancy arises between the two radio receiver devices 3 and 3A, switch 14 will be opened and both lights will be extinguished.

One manner in which these lights 67 and 68 may be mounted is shown in FIGURE 11. There the usual pilot's helmet indicated at 72 is provided with a pair of arms, at the ends of which the lamps 67 and 68 are situated. Thus when an azimuth manoeuvre demand arises the pilot can make the appropriate response. Alternatively the lights could be fixed to the aircraft structure in suitable positions.

It will be appreciated that although the embodiments of the invention described above have all been concerned with the provisions of indicators to assist in the control of aircraft, the invention is equally well applicable in numerous other situations where indications are required.

The terms "vehicle" and "movable craft," as used herein, are intended to comprehend that in or on which a person or thing is or may be carried along the ground, through the air, and on or under water; any moving support or container fitted or used as a means of conveyance.

The following claims are appended to define the invention and are intended to include those modifications which fall within the true spirit thereof.

I claim:
1. A visual indicating device for conveying to an observer stationed in a movable craft information as to a demanded maneuver of the craft, the device comprising an electric signal source for supplying an electric signal that is dependent in magnitude and sense upon a maneuver demand, indicator means which is controllable to provide a continuously changing optical stimulus, and control means responsive to said signal for controlling the indicator means to provide said optical stimulus chang- ing continuously at a rate dependent upon the magnitude and sense of said signal.

2. A visual indicating device for providing a changing optical stimulus, the device comprising indicator means which is responsive to drive applied thereto to provide a moving optical stimulus the rate and sense of movement of which is dependent upon the rate and sense of the applied drive, a plurality of signal sources which are responsive to respective variables to provide signals the magnitudes and senses of which are dependent upon the magnitudes and senses by which the respective variables depart from respective datum values, and control means responsive to said signals to apply drive to said indicator means at a rate and sense dependent upon the magnitudes and senses of said signals.

3. A visual indicating device for conveying to an observer stationed in a movable craft information as to a demanded maneuver of the craft, the device comprising a signal source responsive to attitude of the craft with respect to a datum attitude to supply a signal representative in magnitude of a maneuver demand, indicator means which is controllable to provide an optical stimulus of movement which is both continuous and selectively variable in rate, and control means responsive to said signal for controlling the indicator means to provide said optical stimulus with the rate of said continuous movement dependent upon the magnitude of said signal.

4. A visual indicating device for an observer stationed in a given position in a movable craft and looking in a predetermined general direction, for conveying to the observer information as to a demanded maneuver of the craft by providing a changing optical stimulus in a region lying in the periphery of the field of view of an observer looking in said direction from said position, the device comprising an electrical signal source for supplying an electric signal that is dependent in magnitude and sense upon a maneuver demand for the movable craft in which the observer is stationed, indicator means which is responsive to an applied drive to provide an optical stimulus that changes at a rate and in a sense dependent upon the rate and sense respectively of the applied drive for conveying demand maneuver information relating to the movable craft to said observer by parafoveal stimulation, and control means responsive to said signal to apply drive to the indicator means at a rate and sense dependent respectively upon the magnitude and sense of said signal.

5. A visual indicating device providing a changing optical stimulus in a region lying in the periphery of the field of view of an observer stationed in a given position and looking in a predetermined general direction, the device comprising indicator means which in response to an applied drive provides a moving optical stimulus in a region lying in the periphery of the field of view of an observer looking in said direction from said position, an electric signal source for supplying an electric signal having a magnitude representing the departure of a quantity from a datum value, signal responsive control means to apply drive to the indicator means at a rate dependent upon the magnitude of an applied signal so that the rate of movement of the optical stimulus provided by said indicator means is also dependent upon the applied-signal magnitude, and means coupling the signal source to the control means to apply said signal supplied by the signal source to said control means.

6. A peripheral vision indicating device for an operator positioned within a movable craft, the device comprising means for supplying a signal dependent upon a maneuver demand for the craft, a cylindrical member mounted for rotation about its longitudinal axis and having an optically distinct band extending substantially helically around its cylindrical surface, and means responsive to said signal to rotate the cylinder about said longitudinal axis at a rate and in a sense dependent upon said demand.

7. A visual indicating device for an observer stationed in a given position and looking in a predetermined general direction, the device comprising means for providing a moving optical stimulus in a region lying in the periphery of the field of view of an observer looking in said direction from said position, at least one source of signals representing the departure of a quantity from a datum value, control means constructed to vary the rate and direction of movement of the optical stimulus provided by the first named means in proportion to the magnitude and in dependence upon the sense of an applied signal, and means coupling the signal source to the control means to apply said signals thereto; said first named means comprising a right circular cylindrical member, means for radiating light from a helical area forming part of the surface of said member, the helical area having at least two complete turns, a shaft on which the member is coaxially mounted, and means for transmitting a rotary drive to the shaft; said control means including a motor for imparting a rotary drive to said shaft through said transmitting means, and means for determining the speed and sense of said rotary drive in accordance with the magnitude and sense of said applied signal.

8. A visual indicating device according to claim 7 in which the cylindrical member is hollow, said helical area comprising a helical aperture cut in said member, and said light radiating means comprising a light source within said member.

9. A visual indicating device for an observer stationed in a given position and looking in a predetermined general direction, comprising at least one light source, a carrier for said source which carrier is positioned in the periphery of the field of view of an observer looking in said direction from said position and is movable to move said source and provide a moving optical stimulus in said periphery, and a drive transmission coupled to said carrier to cause movement thereof when in receipt of a drive, and the device further including at least one source of signals representing the departure of a quantity from a datum value, and control means responsive to said signals to drive said drive transmission at a rate and in a sense dependent upon said signals.

10. A visual indicating device for an observer stationed in a given position and looking in a predetermined general direction, comprising a plurality of light sources, a common carrier for said sources which carrier is positioned in the periphery of the field of view of an observer looking in said direction from said position and is movable to move said sources and provide a moving optical stimulus in said periphery, and a drive transmisson coupled to said carrier to cause movement thereof when in receipt of a drive, and the device further including at least one source of signals representing the departure of a quantity from a datum value, and control means responsive to said signals to drive said drive transmission at a rate and in a sense dependent upon said signals.

11. A visual indicating device for conveying to an observer stationed in a movable craft information as to a demanded maneuver of the craft, the device comprising a plurality of electric lamps positioned one after the other in linear array, a signal source for supplying an electric signal that is dependent in magnitude upon a maneuver demand for the craft, and control means responsive to said signal to energize the lamps one at a time in sequence at a rate dependent upon the signal magnitude so as to give rise to an optical effect of movement along the array in accordance with said demand.

12. A visual indicating device according to claim 11, said control means comprising a pulse producing electronic circuit means, said actuating means comprising a multiple electrode discharge tube controlled by the pulses produced by said circuit means.

13. A visual indicating device for conveying to an observer stationed in an aircraft information as to a demanded maneuver of the aircraft, the device comprising an electric signal source for supplying an azimuth maneuver demand signal that is dependent in magnitude and sense upon the departure of the aircraft's path in azimuth from a datum path, and indicator means responsive to said signal to provide an optical stimulus that changes continuously at a rate dependent upon the magnitude and sense of the signal for conveying information as to said demand by parafoveal stimulation.

14. A visual indicating device for conveying to an observer stationed in an aircraft information as to a demanded maneuver of the aircraft, the device comprising an electric signal source for supplying a pitch maneuver demand signal that is dependent in magnitude and sense upon the departure of the aircraft's path in the vertical plane from a datum path, and indicator means responsive to said signal to provide an optical stimulus that changes continuously at a rate dependent upon the magnitude and sense of the signal for conveying information as to said demand by parafoveal stimulation.

15. In a vehicle having a window and an operator's position from which an operator looks in a predetermined direction through the window, a visual indicating device comprising a source of optical stimulus mounted to lie in the periphery of the field of view of an operator when looking in said general direction through the window from said position, means for actuating said source to provide a changing optical stimulus, first means for deriving signals representing the departure from a datum value of a quantity varying with variation of the motion of the vehicle, control means, means coupling the control means both to said signal deriving means and said actuating means, the control means responding to signals applied to it from said signal deriving means by said coupling means to cause said actuating means to actuate said source of optical stimulus to provide a changing optical stimulus in which the change varies to indicate the magnitude and sense of the departure of said quantity from its datum value, a second means for deriving signals similar to said first signal deriving means, signal comparator means connected to both said signal deriving means and operable to affect the optical stimulus produced by said visual indicating device when the signals derived by said first and said second deriving means differ by an amount indicative of error.

16. In a vehicle having a window together with an operator's position from which an operator looks in a predetermined general direction through the window, means responsive to a variable dependent upon maneuver of the vehicle to supply a signal having a magnitude dependent upon the magnitude of said variable, indicator means which is controllable to provide an optical stimulus changing continuously at a selectively variable rate, control means responsive to said signal for controlling said indicator means to provide said continuously changing optical stimulus with said rate of change dependent upon the signal magnitude, and means mounting the indicator means at a boundary of said window to lie in the periphery of the field of view of the operator when looking in said general direction.

17. In an aircraft having a windscreen through which a pilot looks forward of the aircraft, means responsive to attitude of the aircraft in azimuth to supply a signal dependent in magnitude upon said attitude, indicator means which is controllable to provide an optical stimulus changing at a selectively variable rate, control means responsive to said signal for controlling said indicator means to provide said continuously changing optical stimulus with said rate of change dependent upon the signal magnitude, and means mounting the indicator means at the bottom of the windscreen to lie in the periphery of the field of view of the pilot when looking forward of the aircraft.

18. In an aircraft having a windscreen through which a pilot looks forward of the aircraft, means responsive to attitude of the aircraft in pitch to supply a signal dependent in magnitude upon said attitude, indicator means which is controllable to provide an optical stimulus changing at a selectively variable rate, control means responsive to said signal for controlling said indicator means to provide said continuously changing optical stimulus with said rate of change dependent upon the signal magnitude, and means mounting the indicator means at one side of the windscreen to lie in the periphery of the field of view of the pilot when looking forward of the aircraft.

19. In an aircraft, a visual indicating device for conveying to an observer stationed in the aircraft information as to a demanded maneuver of the craft, the device comprising a signal source responsive to the attitude of the craft with respect to a datum attitude for generating a first signal representing the aircraft's bank angle, means for generating a second signal representing the bank angle required to maneuver the aircraft to maintain it on a datum path, means for generating a maneuver demand signal which is the difference of the first and second signals, and indicator means responsive to said maneuver demand signal to provide an optical stimulus of continuous movement at a rate dependent upon the magnitude of said maneuver demand signal for conveying information as to said demand by parafoveal stimulation.

20. In an aircraft, a visual indicating device for conveying to an observer stationed in the aircraft information as to a demanded maneuver of the craft, the device comprising a signal source responsive to the attitude of the craft with respect to a datum attitude for generating a first signal representing the aircraft's pitch angle, means for generating a second signal representing the pitch angle required to maneuver the aircraft to maintain it on a datum path, means for generating a maneuver demand signal which is the difference of the first and second signals, and indicator means responsive to said maneuver demand signal to provide an optical stimulus of continuous movement at a rate dependent upon the magnitude of said maneuver demand signal for conveying information as to said demand by parafoveal stimulation.

21. In a vehicle having an operator's position, and a window through which an operator looks in a predetermined general direction from said position, at least one visual indicating device comprising a right circular cylindrical member, means for radiating light from a helical area forming part of the surface of said member, the helical area having at least two complete turns, a rotatable shaft carrying said cylindrical member coaxial therewith, means supporting the shaft and cylinder at a position in the periphery of the field of view of an operator when looking in said general direction through the window, means for deriving a signal representing the departure from a datum value of a quantity varying with variation of the motion of the vehicle, and control means which is responsive to said signal for rotating said shaft at a rate and in a sense dependent upon the magnitude and sense respectively of said departure as represented by said signal.

22. In a vehicle having an operator's position, and a window through which an operator looks in a predetermined general direction from said position: at least one visual indicating device comprising a right circular cylindrical member, means for radiating light from a helical area forming part of the surface of said member, said helical area having at least two complete turns, a shaft on which the member is coaxially mounted, means for transmitting a rotary drive to the shaft, means supporting the shaft and cylinder at a position in the periphery of the field of view of an operator when looking in said general direction through the window, means for deriving signals representing the departure from a datum value of a quantity varying with variation of the motion of the vehicle, signal responsive control means, means coupling the control means both to said signal source and said rotary drive transmitting means, the control means responding to signals applied to it from said signal source by said coupling means to cause said drive transmitting means to rotate said cylinder at a rate, the magnitude and sense of which varies to indicate the magnitude and sense of the departure of said quantity from its datum value, and error detecting means connected to affect the visual indication produced by the indicating device upon the detection of error in said signals.

References Cited by the Examiner

UNITED STATES PATENTS

| | | | |
|---|---|---|---|
| 1,860,559 | 5/32 | Varney | 340—49 |
| 1,879,267 | 9/32 | Hurni | 340—26 |
| 2,114,759 | 4/38 | Barjot | 340—82 |
| 2,125,668 | 8/38 | Chase | 340—331 X |
| 2,196,113 | 4/40 | Hoffman | 340—82 X |
| 2,289,404 | 7/42 | Ballew | 240—10.1 |
| 2,311,395 | 2/43 | Johnson | 340—263 |
| 2,738,491 | 3/56 | Mihalakis | 340—27 |
| 2,794,082 | 5/57 | Germaine | 340—72 X |
| 2,821,695 | 1/58 | Strock et al. | 340—27 |
| 3,085,429 | 4/63 | Majendie | 340—27 |

OTHER REFERENCES

Aid et al.: "Displaying Integrated Instrumentation," in Electronic Industries, July 1958, pp. 68–70.

Zugsmith et al.: American Journal of Opthalmology, vol. 32, November 1949, pp. 1573–1576.

NEIL C. READ, *Primary Examiner.*

IRVING SRAGOW, E. JAMES SAX, BENNETT G. MILLER, *Examiners.*